United States Patent [19]

Shannon

[11] Patent Number: 5,012,955
[45] Date of Patent: May 7, 1991

[54] SYRUP DISPENSING SYSTEM

[75] Inventor: Joseph W. Shannon, Kent, Ohio

[73] Assignee: ABC/Sebrn TechCorp., Akron, Ohio

[21] Appl. No.: 428,608

[22] Filed: Oct. 30, 1989

[51] Int. Cl.⁵ ............................................. B67D 5/08
[52] U.S. Cl. ..................................... 222/61; 222/641; 222/129.1
[58] Field of Search ............... 222/54, 56, 59, 61-62, 222/64-66, 639-641, 129.1-129.4, 55

[56] References Cited

U.S. PATENT DOCUMENTS

| | | | |
|---|---|---|---|
| 4,006,840 | 2/1977 | Shannon | 222/641 |
| 4,487,333 | 12/1984 | Pounder et al. | 222/54 |
| 4,517,651 | 5/1985 | Kawasaki et al. | 364/479 |
| 4,886,190 | 12/1989 | Kirschner et al. | 222/57 |

FOREIGN PATENT DOCUMENTS

| | | | |
|---|---|---|---|
| 322729 | 7/1989 | European Pat. Off. | 222/129.1 |
| 468095 | 5/1975 | U.S.S.R. | 222/59 |
| 2176026 | 12/1986 | United Kingdom | 222/54 |

Primary Examiner—Kevin P. Shaver
Assistant Examiner—Gregory L. Huson
Attorney, Agent, or Firm—Renner, Kenner, Grieve, Bobak, Taylor & Weber

[57] ABSTRACT

A syrup dispensing system for use in a soft drink dispenser. Sensors are placed in the syrup dispensing flow path to measure the rate of flow of the syrup at the commencement of a dispensing cycle. In a first embodiment of the invention, a regulatable pressure source is then adjusted during the remainder of the dispensing cycle to assure that a full measure of syrup is dispensed. In another embodiment of the invention, the period of time during which the dispensing valve in open is then modified as a function of the flow rate to assure that a full measure of syrup is dispensed.

15 Claims, 1 Drawing Sheet

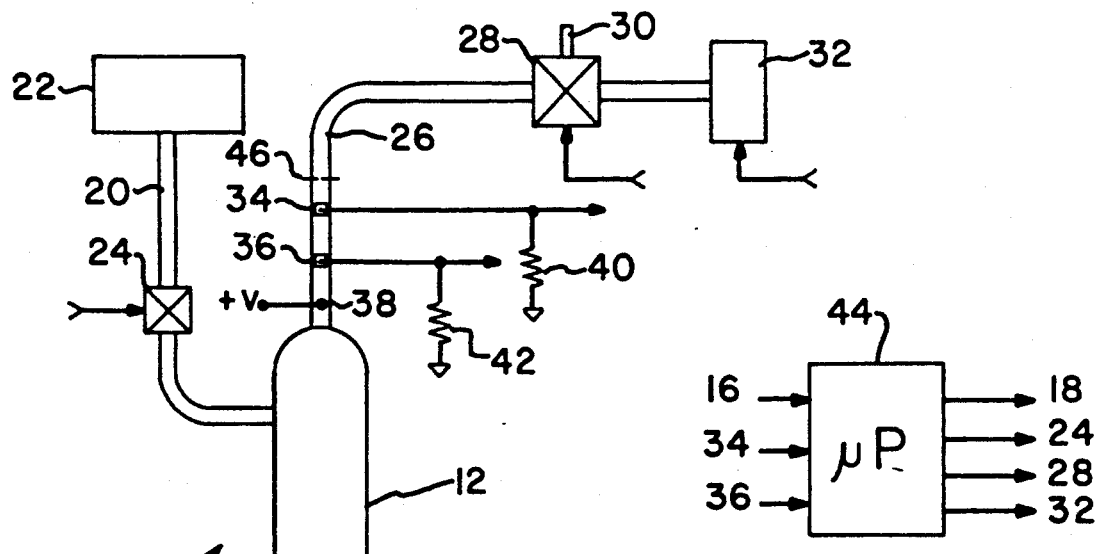
FIG.-2
FIG.-1
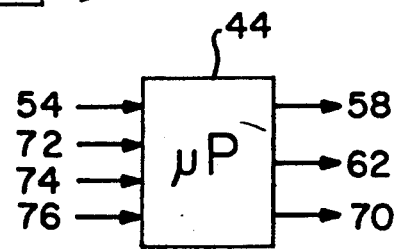
FIG.-4
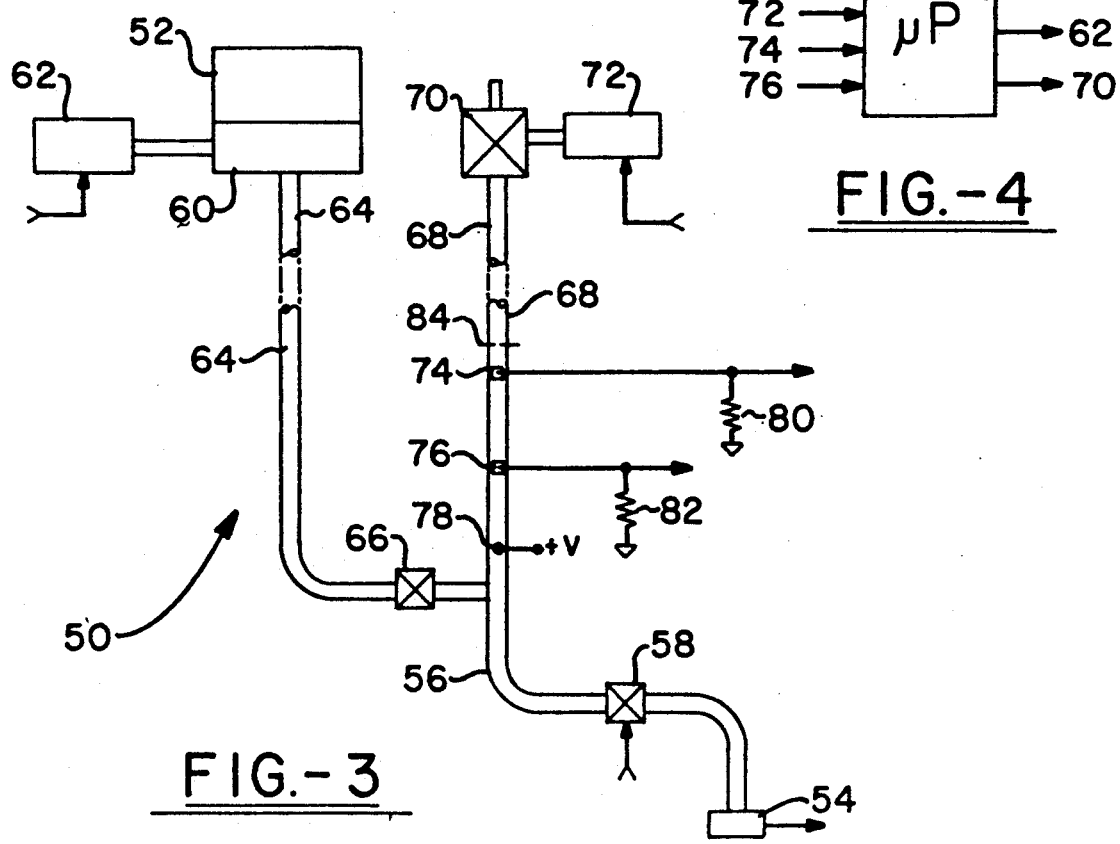
FIG.-3

SYRUP DISPENSING SYSTEM

TECHNICAL FIELD

The invention herein resides in the art of soft drink beverage dispensers. More particularly, the invention relates to a syrup dispensing system which assures that consistent and accurate measures of syrup are dispensed during the dispensing of each soft drink.

BACKGROUND ART

Soft drinks are typically formulated from a combination of carbonated water (soda) and a flavoring syrup. In soft drink beverage dispensing systems, the syrup is preferably dispensed under pressure for a fixed period of time, such period equating to a desired volume of syrup. However, it is well known that syrup viscosity changes with temperature, atomsphere, and various other parameters. Accordingly, if the syrup is dispensed for a fixed period of time at a fixed temperature, the amount of syrup dispensed will be a function of its viscosity, resulting in a "weak" or "strong" drink. In such situations, not at all uncommon in prior systems, the customer or consumer is often dissatisfied with the taste of the drink.

Attempts to compensate for syrup viscosity changes have been extensive and somewhat sophisticated. It has previously been known to monitor the temperature of the syrup and then adjust the timing of the dispensing cycle to compensate for corresponding changes in viscosity. In presently known beverage dispensers, a microprocessor is typically used as the control mechanism for the system. Such a microprocessor readily provides means for achieving such compensation, by simply storing a table which relates temperature to viscosity and, in turn, to flow rates such that the period of the dispensing cycle can be varied to assure the appropriate volume of syrup is dispensed. Typically, the prior art would set its standard dispensing cycle for the thickest anticipated syrup and then shorten the cycle to compensate for the thinner syrups actually experienced. It further has been known to set the standard dispensing cycle in a middle range and then lengthen or shorten the dispensing cycle dependent upon the monitored temperature.

In the prior art, the monitoring of the syrup temperature, while reasonable in theory, has a number of shortcomings. As mentioned above, temperature is only one parameter that affects viscosity, there being several others. By measuring only temperature, there is still no assurance that flow rates and, accordingly, total volume dispensed can actually be controlled. Further, the measurement of the temperature of syrup at one or two points in a system is not necessarily indicative of the temperature throughout the system. Large systems, serving plural dispensing stations from a single supply source, may have syrups displaying different viscosities at different points throughout the system. Finally, the prior art does not really monitor or control the critical parameter of rate of syrup flow, but seeks to extrapolate the affect that temperature will have on flow rate by (1) assuming that flow rate is determined principally by temperature, and (2) assuming that the temperature at one or two points within the system is indicative of the viscosity of the syrup throughout the system.

There is a need in the art for a syrup dispensing system which is responsive to flow rates, not temperature or viscosity, for it is the flow rate of the syrup which is ultimately of paramount importance.

DISCLOSURE OF INVENTION

In light of the foregoing, it is a first aspect of the invention to provide a syrup dispensing system which is responsive directly to syrup flow rate.

Another aspect of the invention is the provision of a syrup dispensing system which is not dependent on measurements or calculations of temperature, viscosity, or atmosphere.

Yet another aspect of the invention is the provision of a syrup dispensing system which works with either gravity or pressurized feed systems.

Still a further aspect of the invention is the provision of a syrup dispensing system which is simple in construction and operation while being conducive to implementation with state of the art beverage dispensing systems.

The foregoing and other aspects of the invention which will become apparent as the detailed description proceeds are achieve by a syrup dispensing system, comprising: a dispensing head for dispensing syrup into a container placed therebeneath during a dispensing cycle; a pump means in communication with said dispensing head for receiving and maintaining a reservoir of syrup therein and passing said syrup to said dispensing head; and flow sensing means in communication with said pump means for measuring a rate of flow of said syrup from said dispensing head.

Yet further aspects of the invention are obtained by a syrup dispenser for a beverage dispensing system, comprising: a pump for receiving and maintaining a reservoir of syrup; a dispensing head in communication with said pump for receiving and dispensing syrup therefrom during a beverage dispensing cycle; first means in communication with said pump for sensing a flow rate of syrup at commencement of said dispensing cycle; and second means in communication with said pump for adjusting said flow rate during said dispensing cycle to assure the dispensing of a predetermined volume of syrup during said dispensing cycle.

Additional aspects of the invention are attained by a syrup dispensing system, comprising; a dispensing head; a bulk supply of syrup; a dispensing line interposed between said dispensing head and said bulk supply of syrup; and sensing means interconnected with said dispensing line for determining a rate of flow of syrup through said dispensing line and out of said dispensing head.

DESCRIPTION OF DRAWINGS

For a complete understanding of the objects, techniques and structure of the invention reference should be made to the following detailed description and accompanying drawings wherein:

FIG. 1 is a schematic diagram of a syrup dispensing system according to the invention;

FIG. 2 is a block diagram showing the control signals necessary for obtaining the desired syrup flow regulation;

FIG. 3 is a schematic diagram of an embodiment of the invention in which syrup is dispensed directly from a bulk supply; and FIG. 4 is a block diagram showing the control signals of the system of FIG. 3.

BEST MODE FOR CARRYING OUT THE INVENTION

Referring now to the drawings and more particularly FIG. 1, it can be seen that a syrup dispensing system according to the invention is designated generally by the numeral 10. It will be appreciated that the syrup system 10 is contemplated for use in a digitally controlled beverage dispensing system in which metered volumes of soda and syrup are dispensed into a receiving container for distribution to consumers. The microprocessor control of such systems is now well known and understood by those skilled in the art and allows for the dispensing of various sizes of various soft drink beverages, including diet soft drinks, in a rapid fashion and without fear of foaming or overflow. Additionally, the microprocessors provide means for inventory control, pricing, and the like. While the concept of the invention may be applied to even the most rudimentary soft drink dispensers, its adaptation to state of the art systems is most appropriate.

A key portion of the syrup dispensing system 10 is a pump 12 which is typically a tubular or cylindrical member adapted for receiving and maintaining a reservoir of syrup therewithin. As will become apparent below, the pump 12 comprises a container in selective communication with a source of syrup and a source of pressure. A dispensing tube 14 extends from the bottom of the pump 12 and communicates with a dispensing head 16. In somewhat standard fashion, associated with the dispensing head 16 would be a pour switch or other signal device indicating that a cup has been placed under the head and that the soft drink can be dispensed therein. Upon actuation of the pour switch, the solenoid flow control valve 18 is actuated to open the path of the dispensing tube 14 to allow the dispensing of syrup through the head 16 and into the receiving cup.

As shown, a tube 20 communicates with a bulk supply of syrup 22 to the pump 12 to replenish the syrup reservoir as it is dispensed by the pump. It will be appreciated by those skilled in the art that the bulk supply 22 may be a gravity feed type of system in which the syrup passes from the supply 22 by gravity, or may be a pressurized system, in which case a pressure source urges the syrup from the supply 22 into the reservoir of the pump 12. A solenoid control valve 24 may be interposed in the line 20 to control the flow of syrup into the pump 12 upon demand.

The neck or upper extension 26 of the pump 12 communicates with the three-way valve 28 which, as is well known in the art, provides a vent 30 to atmosphere. When the pump 12 is being replenished with syrup from the bulk supply 22, the valve 28 simply vents the pump 12 to atmosphere, allowing the replenishment to occur.

Also communicating with the pump 12 through the three-way valve 28 is a regulatable pneumatic pressure source 32. The pressure source 32 may provide air, or appropriate gas such as carbon dioxide, under pressure and onto the reservoir of the pump 12. The pressure head so created provides the pressure source for urging the syrup from the pump 12, through the dispensing tube 14 and valve 18, and out of the dispensing head 16. Positioned within the neck 26 is a top sensor 34, bottom sensor 36, and voltage pin 38. It will be appreciated that the sensors 34, 36 comprise electrical conductors, as does the pin 38. Accordingly, when the syrup is present within the neck 26, current can pass from the voltage source V to the pin 38, through the syrup within the neck, and to ground through the resistor 40 and pin 34. In like manner, an electrical signal can similarly pass to ground via the pin 36 and resistor 42. Obviously, when the level of the syrup is at the point 46, both pins 34, 36 are conducting and voltage levels are present between the pins and the respective resistors.

As mentioned above, a microprocessor or other suitable control unit, readily understood by those skilled in the art, is used in conjunction with the syrup dispensing system 10 in a fashion to be discussed below.

Prior to a dispensing cycle, the syrup level 46 is typically as shown in FIG. 1, above the sensor 34. The valves 18, 24 are closed. Upon actuation of the pour switch of the dispensing head 16, the microprocessor 44 causes the three-way valve 28 to interconnect the regulatable pressure source 32 with the pump 12 through the neck 26. With a pressure head on the syrup within the pump 12, the dispensing valve 18 is opened by the microprocessor 44 to allow syrup to be dispensed through the dispensing head 16. At the end of the dispensing cycle, the dispensing valve 18 closes, the three-way valve 28 disconnects the pressure source 32 from the pump 12 and vents the pump to atmosphere through the vent 30. Finally, the valve 24 is opened to allow syrup to replenish the reservoir of the pump 12. When the syrup rises in the neck 26 to contact the sensor 34, a signal is presented at the top of the resistor 40, such being sensed by the microprocessor 44 to shut the valve 24 and terminate replenishment. Due to lag time, the syrup level refills to level 46, slightly above the sensor 34. In this posture, the system 10 is ready for another dispensing cycle.

As a key feature of the instant invention, a determination is made at the beginning of each dispensing cycle as to the flow rate of the syrup being dispensed. When the three-way valve 28 switches to pressurize the pump 12 with the pressure source 32, dispensing is again actuated upon opening of the valve 18 under control of the microprocessor 44. Immediately upon commencement of the dispensing cycle, the syrup level 46 in the neck 26 drops below the sensor 34, passing a ground signal to the microprocessor 44 and indicating time $T_0$. Shortly thereafter, the syrup level 46 passes below the sensor 36, presenting a second output signal to the microprocessor 44, indicating time $T_1$. The elapse time of $T_1 - T_0$ is that period of time necessary to dispense the small volume of syrup in the neck 26 between the sensors 34, 36. The microprocessor may then quickly determine the flow rate of the syrup from the system as a whole, independent of temperature variations or the like within the system. Having made this determination, the microprocessor can then adjust pressure of the regulatable pressure source 32 during the remainder of the dispensing cycle to assure that a full measure of syrup is dispensed during the cycle. The adjustment can, of course, be modified by increasing or decreasing the pressure head. It is contemplated that the control unit 44 will cause the next dispensing cycle to commence at the pressure level adjusted for the previous dispensing cycle such that adjustments of pressure will be minimized. In any event, it will be appreciated that at the very beginning of the dispensing cycle the flow rate is determined and, knowing the dispensing cycle will be the fixed amount of time of actuation of the valve 18, the pressure head will be adjusted to assure full volume dispensing.

In accordance with another concept of the invention, the pressure source 32 may be maintained at a constant pressure and the time of actuation of the valve 18 may be regulated to assure that the proper volume of syrup has been dispensed. According to this concept of the invention, the flow rate is determined as presented above at the beginning of the dispensing cycle by means of the sensors 34, 36. With the microprocessor 44 thus having determined the flow rate of the syrup, the period of actuation of the valve 18 may then be either increased or decreased to assure that a full measure of syrup is dispensed. On each subsequent disbursement, adjustment will be made from the time period for the prior disbursement such that total adjustments in timing will be minimized. In any event, by having a fixed pressure source and determining the flow rate at the beginning of the dispensing cycle, the period of the dispensing cycle may simply be expanded to assure full measure dispensing. Those skilled in the art will appreciate that the dispensing cycle can be effected by a single actuation of the valve 18 for a fixed time period, or by a series of pulsed actuations in which the sum of the pulse periods equal the total dispensing cycle period. The number of pulse periods is selected as a function of the monitored flow rate.

As shown in FIG. 2, the inputs to the control system or microprocessor 44 are simply the output of the pour switch of the dispensing head 16 and the outputs of the sensors 34, 36. As further shown, the outputs of the microprocessor 44 include a control signal to the dispensing valve 18 to actuate it for a fixed period of time according to one embodiment of the invention, or to regulate the period of such actuation according to another. An output signal is also presented to the valve 24 to allow replenishment of the reservoir of the pump 12, such replenishment being determined when the level 46 again passes the sensor 34 to present an output signal to the microprocessor 44, at which time the valve 24 is again closed. The microprocessor 44 also controls the three-way valve 28 which vents the pump 12 to atmosphere when refilling the reservoir, and interconnects the pump 12 with the pressure source 32 when a dispensing cycle is to be entered. Finally, a control signal from the microprocessor 44 is passed to the pressure source 32 in the first embodiment of the invention in which the pressure source may be regulated as by the inclusion of a pressure regulator within the source 32. In that embodiment, the pressure is appropriately increased or decreased upon a determination of the initial flow rate to be certain that the appropriate volume is dispensed in the fixed period of the dispensing cycle.

The concept of the invention may be employed with existing beverage systems in which syrup is dispensed directly from a bulk supply. The simple addition of a stand pipe and flow sensors to such an existing system can adapt the same to attain the benefits of the instant invention as described above. Such a syrup dispensing system is designated generally by the numeral 50 in FIG. 3 and includes a bulk supply of syrup 52 to be dispensed from a dispensing head 54 through a dispensing line 56. As before, a solenoid dispensing valve 58 is interposed in the line 56 to control the requisite dispensing.

A pressure pump 60 communicates with the bulk syrup supply 52 to drive syrup through a pump dispensing line 64 and check valve 66 to the dispensing line 56. The pressure head for operating the pump 60 is provided by the regulated pneumatic pressure source 62 of air or suitable gas such as carbon dioxide. As previously known in the art, pressurization of the pump 60 by the pressure source 62 is operative to force syrup from the bulk supply 52, and through the dispensing lines 64, 56 and out of the head 54 when the dispensing valve is opened.

Added to the prior art structure just described is a standpipe or tube 68, interconnected at one end to a common junction of the dispensing lines 56, 64, and at the other to a 3-way valve 70 which is selectively activated to simply seal that end of the standpipe or to connect the standpipe 68 to atmosphere by venting or to a fixed pressure source 72. Actuation of the valve 70 is preferably under microprocessor control as discussed later herein.

As in the prior embodiment, the standpipe 68 receives a top sensor 74, bottom sensor 76, and a voltage source pin 78, each comprising an electrical conductor interposed in a syrup flow path of the standpipe, the voltage source pin 78 being downstream of the sensors 74, 76. As shown, resistors 80, 82 are interposed between respective sensors 74, 76 and ground. When the syrup in the standpipe departs from its full level 84 below the top sensor 74, the voltage at the interconnection of the resistor 80 and top sensor 74 goes from the level of the voltage source 78 to ground. Similarly, when the syrup level drops below the pin 76, the voltage at the interconnection of the bottom sensor 76 and resistor 82 also drops from the voltage level of the source 78 to ground.

Operation of the system 50 closely follows that of the system 10. A signal from a pour switch associated with the dispensing head 54 indicates that a dispensing cycle is initiated. The valve 70 switches to interconnect the fixed pressure source 72 with the standpipe 68. With the pump 60 and/or pressure source 62 off or at a low pressure level, the check valve 66 prevents any backflow of syrup into the line 64. Immediately upon opening the dispensing valve 58, syrup in the standpipe 68 begins to flow, sequentially breaking contact at the top and bottom sensors 74, 76, respectively establishing times $T_0$ and $T_1$ as hereinabove. The time period between $T_0$ and $T_1$ for depleting the fixed volume of syrup between the sensors 74, 76, indicates the syrup flow rate at the pressure of the source 72 under the ambient conditions. This data is immediately used by the microprocessor or other control device to set the pressure of the regulated pressure source to control the pump 60 to assure that an appropriate volume of syrup is dispensing from the supply 52 within the remaining time of the dispensing cycle to attain full measure dispensing during the cycle.

Immediately at time $T_1$ the valve 70 is activated to seal the end of the standpipe 68 such that the remainder of the syrup dispensing is under control of the regulated pressure source 62 which is simultaneously activated.

At the end of the dispensing cycle, the valve 58 is closed, terminating syrup flow. The valve 70 is then activated to vent to atmosphere, allowing the standpipe 68 to refill. When the syrup reaches the top sensor 74, the resultant signal at the resistor 80 turns off the pressure source 62 with the syrup then being slightly above the top sensor 74 at the level 84. At this time, the valve 70 may remain vented to atmosphere, or it may be switched to either seal the standpipe 68 or to apply the pressure of the source 72 thereto, awaiting the next dispensing cycle.

It will, of course, be understood that the data obtained from the timing for depleting the standpipe between the sensors 74, 76 may be used to control the timing of the actuation of the dispensing valve 58 to assure that a full measure of syrup is dispensed. On such a system, the pressure source 62 could be a constant pressure source with the timing of the actuation of the valve 58 compensating for the ambient flow characteristics of the syrup.

In the embodiment of FIG. 3, it is preferred that the flow path characteristics of the standpipe 68 be substantially identical to those of the dispensing pump line 64. Since the dispensing line 56 is a common dispensing path for both the standpipe 68 and pump line 64, for the data obtained from the standpipe 68 to translate to the line 64, the two must be as identical in nature as possible. In the preferred embodiment, the standpipe 68 and line 64 are of identical lengths, material, wall thickness, and diameters (both inside and outside), are as short as possible, and run immediately adjacent each other, such that the syrup flow characteristics of one will be substantially identical to the other.

It should be appreciated that an existing syrup pumping system employing elements 52–64 may be modified to accept the standpipe and associated elements 68–82 by the simple insertion of a "Tee" connection in the dispensing line to receive the standpipe 68, and the inclusion of a check valve 66 in the pump line 64.

It will also be appreciated that the system 50 may be suitably controlled by the microprocessor of FIG. 2, having as inputs a pour switch from the head 54, the signals from the top and bottom sensors 74, 76 and, if desired, a signal from the fixed pressure source 72 to correlate the data received from the sensors 74, 76 with a particular pressure, particularly if the pressure at the fixed source 72 should vary. The output control signals of the microprocessor 44 would include a control signal to the regulated pressure source 62 to regulate the pressure, control signals to the valve 70, and a control signal to activate the solenoid valve 58 for a desired period of time. A block diagram of such control is shown in FIG. 4.

Thus it can be seen that the objects of the invention have been satisfied by the structure presented above. While in accordance with the patent statues only the best mode and preferred embodiments of the invention have been presented and described in detail, it is to be understood that the invention is not limited thereto or thereby. Accordingly, for an appreciation of the true scope and breadth of the invention reference should be made to the following claims.

What is claimed is:

1. A syrup dispensing system, comprising:
   a dispensing head for dispensing syrup into a container placed therebeneath during a dispensing cycle;
   a pump means in communication with said dispensing head for receiving and maintaining a reservoir of syrup therein and passing said syrup to said dispensing head;
   flow sensing means in communication with said pump means for measuring a rate of flow of said syrup from said dispensing head, said flow sensing means comprising first and second sensors interposed in a flow path of said pump means, said sensors defining a fixed volume therebetween within said flow path; and
   flow adjustment means in communication with said pump means and said flow sensing means for adjusting said rate of flow of said syrup during said dispensing cycle.

2. The syrup dispensing system as recited in claim 1, wherein said flow sensing means further comprises a voltage source interposed in said reservoir of syrup between said dispensing head and said pair of sensors.

3. The syrup dispensing system as recited in claim 1, wherein said flow sensing means determines said rate of flow of said syrup at the beginning of said dispensing cycle by measuring a period of time for depleting said fixed volume of syrup between said first and second sensors.

4. The syrup dispensing system as recited in claim 3, further comprising a valve interposed between said pump and said dispensing head for commencing and terminating dispensing of syrup from said dispensing head, said flow adjustment means regulating a period of actuation of said valve as a function of said period of time for depleting said fixed volume.

5. A syrup dispensing system as recited in claim 3, wherein said flow adjustment means comprises an adjustable source of pneumatic pressure in communication with said pump for creating a pressure head for dispensing said syrup and for regulating said pressure head as a function of said period of time for depleting said fixed volume.

6. A syrup dispensing system as recited in claim 5, wherein said pressure head is regulated during said dispensing cycle as a function of said period of time for depleting said fixed volume measured at said beginning of said dispensing cycle.

7. A syrup dispenser for beverage dispensing system, comprising:
   a pump for receiving and maintaining a reservoir of syrup;
   a dispensing head in communication with said pump for receiving and dispensing syrup therefrom during a beverage dispensing cycle;
   first means in communication with said pump for adjusting said flow rate during said dispensing cycle to assure the dispensing of a predetermined volume of syrup during said dispensing cycle, said first means comprising a pair of sensors in a flow path of said pump; and
   second means in communication with said pump for adjusting said flow rate during said dispensing cycle to assure the dispensing of a predetermined volume of syrup during said dispensing cycle.

8. The syrup dispenser as recited in claim 7, wherein said flow path between said pair of sensors defines a fixed volume of syrup therebetween.

9. A syrup dispenser as recited in claim 8, wherein said first means determines said flow rate of syrup by measuring a period of time required for depleting said fixed volume of syrup between said pair of sensors at commencement of a dispensing cycle.

10. The syrup dispenser system as recited in claim 9, further comprising a dispensing valve between said pump and dispensing head for commencing and terminating dispensing of syrup from said dispensing head, said second means controlling the duration of a period of actuation of said valve during said dispensing cycle as a function of said period of time for depleting said fixed volume of syrup at commencement of said dispensing cycle.

11. The syrup dispenser system as recited in claim 10, further comprising a source of pneumatic pressure in communication with said pump for imposing a pressure head on said reservoir of syrup, said second means controlling said source of pneumatic pressure to regulate said pressure head as a function of said period of time required for depleting said fixed volume of syrup between said sensors and commencement of said dispensing cycle.

12. A syrup dispensing system, comprising;
a dispensing head;
a bulk supply of syrup;
a dispensing line interposed between said dispensing head and said bulk supply of syrup;
sensing means interconnected with said dispensing line for determining a rate of flow of syrup through said dispensing line and out of said dispensing head:
flow adjustment means interposed between said bulk supply of syrup and said dispensing head for regulating a flow of syrup from said bulk supply to said dispensing head as a function of said rate of flow as sensed by said sensing means, wherein said rate of flow is determined by said sensing means at a beginning of a dispensing cycle and said regulating of said flow of syrup proceeds thereafter for the remainder of said dispensing cycle; and
wherein said sensing means comprises a standpipe interconnected between said pump and said dispensing head, said standpipe receiving a sensor.

13. The syrup dispensing system according to claim 12, further comprising means for driving syrup from said standpipe to said dispensing head at said beginning of said dispensing cycle, and from said pump to said dispensing head thereafter.

14. The syrup dispensing system according to claim 13, further comprising a pump interposed between said bulk supply of syrup and said dispensing line, said flow adjustment means regulating said pump.

15. The syrup dispensing system according to claim 13, further comprising a dispensing valve in said dispensing line, said flow adjustment means regulating said valve.

* * * * *